US010906590B2

(12) United States Patent
Osorio (10) Patent No.: US 10,906,590 B2
(45) Date of Patent: Feb. 2, 2021

(54) VEHICLE ASSEMBLY AND METHODS OF MAKING AND USING THE SAME

(71) Applicant: Honda Motor Co., Ltd., Tokyo (JP)

(72) Inventor: Sebastian Osorio, Columbus, OH (US)

(73) Assignee: HONDA MOTOR CO., LTD., Tokyo (JP)

( * ) Notice: Subject to any disclaimer, the term of this patent is extended or adjusted under 35 U.S.C. 154(b) by 216 days.

(21) Appl. No.: 16/234,548

(22) Filed: Dec. 27, 2018

(65) Prior Publication Data

US 2020/0207421 A1 Jul. 2, 2020

(51) Int. Cl.
*B62D 25/04* (2006.01)
*B60R 22/34* (2006.01)
*B60N 3/02* (2006.01)
*B60J 5/04* (2006.01)

(52) U.S. Cl.
CPC ............... *B62D 25/04* (2013.01); *B60N 3/02* (2013.01); *B60R 22/34* (2013.01); *B60J 5/0487* (2013.01)

(58) Field of Classification Search
CPC .......... B62D 25/04; B60J 5/0487; B60N 3/02; B60R 22/34; B60R 22/24; B60R 22/18
USPC ..... 296/202, 146.9, 1.02; 280/756, 807, 808
See application file for complete search history.

(56) References Cited

U.S. PATENT DOCUMENTS

| | | | |
|---|---|---|---|
| 6,152,490 A | 11/2000 | Suzuki et al. | |
| 7,578,523 B2 | 8/2009 | Kosuge et al. | |
| 8,360,472 B2 | 1/2013 | Froschle | |
| 8,651,525 B2 | 2/2014 | Kaku et al. | |
| 9,346,373 B2 | 5/2016 | Cai et al. | |
| 9,475,413 B2 | 10/2016 | Hayashi et al. | |
| 9,517,749 B2 | 12/2016 | Iguchi | |
| 10,202,099 B2* | 2/2019 | Tsumiyama | ............ B60R 22/18 |
| 2008/0061542 A1 | 3/2008 | Froschle et al. | |
| 2013/0168951 A1* | 7/2013 | Yamamoto | ........... B60N 2/3031 |
| | | | 280/807 |
| 2014/0217715 A1* | 8/2014 | Minami | ................... B60N 2/24 |
| | | | 280/807 |

FOREIGN PATENT DOCUMENTS

DE 102011112811 A1 3/2013

* cited by examiner

*Primary Examiner* — Joseph D. Pape
(74) *Attorney, Agent, or Firm* — Kenealy Vaidya LLP

(57) ABSTRACT

A vehicle assembly that can include a frame assembly, a door assembly, a striker assembly, a door latch assembly, a seat belt retractor assembly and a cover assembly. The striker assembly can be mounted on the frame assembly. The door latch assembly can be mounted on the door assembly. The door latch assembly can include a latch mechanism configured to releasably engage the striker assembly when the door assembly is in the closed position. The seat belt retractor assembly selectively wind and unwind a seat belt. The seat belt retractor assembly can be mounted on a first portion of the frame assembly. The seat belt retractor assembly can be spaced away from a second portion of the frame assembly by a gap. The cover assembly can be mounted on the frame assembly. The cover assembly can cover at least a portion of the gap and the striker assembly.

20 Claims, 6 Drawing Sheets

VEHICLE ASSEMBLY AND METHODS OF MAKING AND USING THE SAME

BACKGROUND

The disclosed subject matter relates to a vehicle assembly that includes a cover assembly. More particularly, the disclosed subject matter relates to a cover assembly that covers more than one portion of the vehicle assembly.

A vehicle can include one or more doors or door assemblies that can permit ingress/egress to/from a vehicle interior or vehicle storage area. A door assembly of a vehicle can be pivotally attached to a frame or other supporting structure of a vehicle. For example, a door assembly can be pivotally attached by a hinge so as to allow the door assembly to be opened and closed. A door assembly of a vehicle can include and/or be associated with various components. The components can include a latch assembly for a door and a striker assembly that is mounted on the frame. The latch assembly can engage the striker assembly so as to secure the door in a the closed position. The vehicle can also include a seat belt retractor assembly to provide securement of an occupant in the vehicle.

However, known arrangements of door assemblies, as well as components associated with door assemblies have deficiencies.

SUMMARY OF THE INVENTION

Some embodiments are directed toward a vehicle assembly that can include a frame assembly, a door assembly, a striker assembly, a door latch assembly, a seat belt retractor assembly and a cover assembly. The door assembly can mounted on the frame assembly and can be movable relative to the frame assembly between a closed position and an opened position. The striker assembly can be mounted on the frame assembly. The door latch assembly can be mounted on the door assembly. The door latch assembly can include a latch mechanism configured to releasably engage the striker assembly when the door assembly is in the closed position. The seat belt retractor assembly can be configured to selectively wind and unwind a seat belt. The seat belt retractor assembly can be mounted on a first portion of the frame assembly. The seat belt retractor assembly can be spaced away from a second portion of the frame assembly by a gap. The cover assembly can be mounted on the frame assembly. The cover assembly can cover the striker assembly and at least a portion of the gap.

Some embodiments are directed toward a vehicle that can include a frame assembly, a door assembly, a striker assembly, a door latch assembly, a seat belt retractor assembly and a cover assembly. The frame assembly can frame a door opening and can include a first frame member extending along the door opening in a vertical direction of the vehicle, and grab bar connected to and extending away from the first frame member in a transverse direction of the vehicle. The door assembly can be mounted on the frame assembly and movable relative to the frame assembly between a closed position and an opened position. The striker assembly can be mounted on the frame assembly. The door latch assembly can be mounted on the first door assembly. The door latch assembly can include a latch mechanism that is configured to releasably engage the striker assembly when the first door assembly is in the closed position. The seat belt retractor assembly can be configured to selectively wind and unwind a seat belt. The seat belt retractor assembly can be mounted on a first portion of the frame assembly. The seat belt retractor assembly can be spaced away from a second portion of the frame assembly by a gap. The cover assembly can be mounted on the frame assembly. The cover assembly can cover the gap and at least one of the door latch assembly and the striker.

Some embodiments are directed toward an all-terrain vehicle that can include a frame assembly, a plurality of wheels, a first door assembly, a second door assembly, a striker assembly, a door latch assembly, seat belt retractor assembly and a cover assembly. The frame assembly can include a plurality of frame members connected together to extend around a passenger area and to form a first door opening and a second door opening. The plurality of frame members can include a first frame member extending along a vertical direction of the vehicle, a second frame member connected to the first frame assembly and extending away from the first frame member along a transverse direction of the vehicle, and a third frame member extending along the vertical direction of the vehicle. The first frame member can extend between the first door opening and the second door opening, and the second door opening can extend between the first frame member and the third frame member. The plurality of wheels can be connected to the frame assembly. At least one of the wheels is configured to be driven by a powertrain. The first door assembly can be pivotally connected to the first frame member. The second door assembly can be pivotally connected to the third frame member. The striker assembly can be mounted on the first frame member. The door latch assembly can be mounted on the second door assembly. The door latch assembly can include a latch mechanism that is configured to releasably engage the striker assembly when the second door assembly is in the closed position. The seat belt retractor assembly can be configured to selectively wind and unwind a seat belt, the seat belt retractor assembly is mounted on the second frame member. The seat belt retractor assembly can be spaced away from a second frame member by a gap. The cover assembly can be mounted on the frame first frame member. The cover assembly can cover the striker assembly and at least a portion of the gap.

BRIEF DESCRIPTION OF THE DRAWINGS

The disclosed subject matter of the present application will now be described in more detail with reference to exemplary embodiments of the apparatus and method, given by way of example, and with reference to the accompanying drawings, in which.

DETAILED DESCRIPTION OF EXEMPLARY EMBODIMENTS

A few inventive aspects of the disclosed embodiments are explained in detail below with reference to the various figures. Exemplary embodiments are described to illustrate the disclosed subject matter, not to limit its scope, which is defined by the claims. Those of ordinary skill in the art will recognize a number of equivalent variations of the various features provided in the description that follows.

Figure 1:
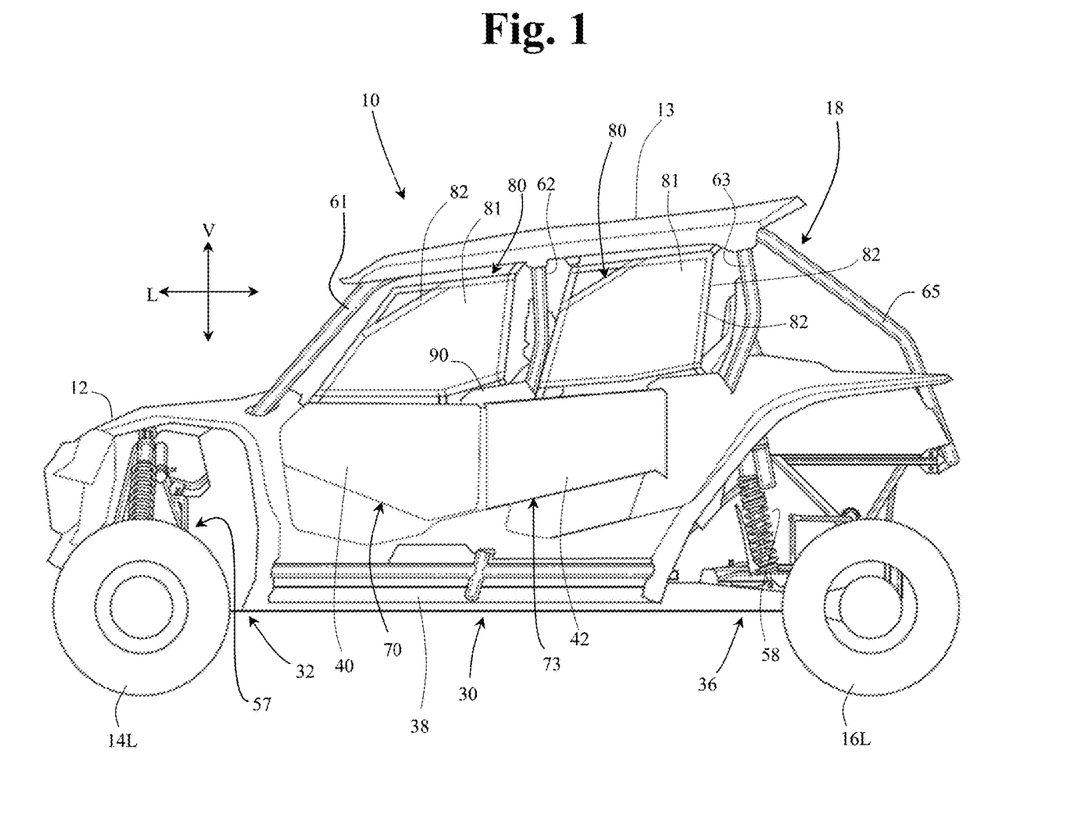
FIG. 1 is a left side view of an exterior of a vehicle in accordance with the disclosed subject matter.

A vehicle assembly is provided that includes a cover assembly. The cover assembly can cover and/or be beneficially associated with various components or assemblies of the vehicle that are provided with a door assembly of the vehicle. Such various components or assemblies can include a striker assembly mounted on a frame assembly of the vehicle, a door latch assembly mounted on a door assembly, and a seat belt retractor assembly mounted on the frame assembly. One or more of these components or assemblies may include one or more openings or one or more gaps between adjacent components/assemblies that may be aesthetically unpleasing. Further, objects external to the vehicle, such as but not limited to dirt, small stones/rocks, small plant material can enter the nay of the gaps/openings that exposed on a vehicle that intended for use on an unimproved path or on an unmarked path. Thus, it may be desirable to cover any exposed openings in and gaps between components/assemblies. For example, a cover assembly can cover at least a portion of a gap between the seat belt retractor assembly and a portion of the frame assembly. The cover assembly can also cover the striker assembly and or the latch assembly. The cover assembly can prevent access to gaps between components or assemblies of the vehicle and provide an aesthetically pleasing appearance, The vehicle 10 shown in FIG. 1 is specialized for use on an unimproved path or on an unmarked path, and can be referred to as a multipurpose utility vehicle (MUV) or as a side-by-side all-terrain vehicle (SxS, or SxS ATV). However, the disclosed vehicle frame assembly with door assembly can be used with any vehicle that is configured for travel along any one or combination of improved, unimproved, and unmarked paths. For example, embodiments are intended to include or otherwise cover any type of automobile, including a passenger car, minivan, truck, other types of all-terrain vehicle (ATV), semi-tractor, off-highway vehicle, etc.

Figure 3:
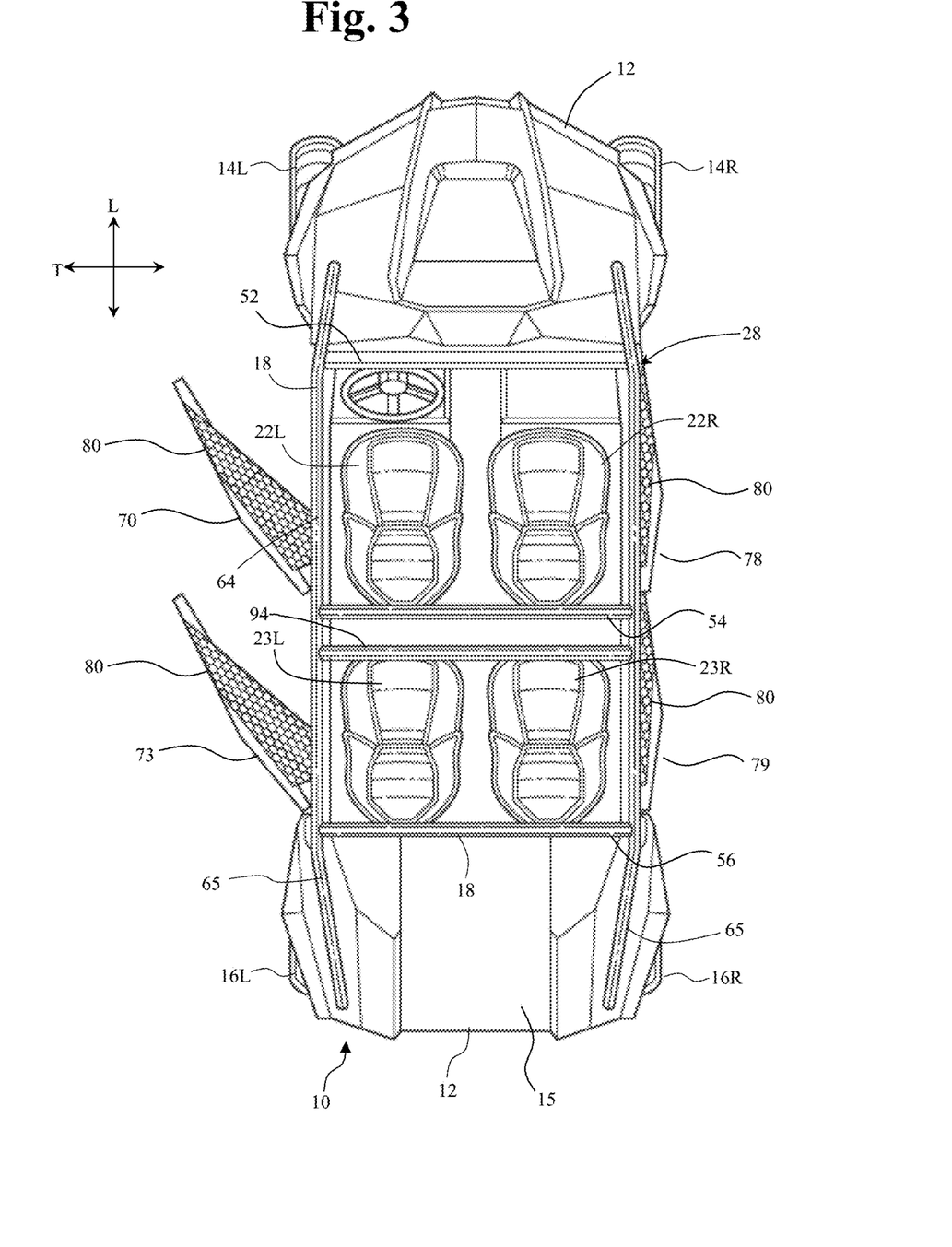
FIG. 3 is a top view of the vehicle shown in FIG. 1 in accordance with the disclosed subject matter.

Referring to FIGS. 1 and 3, the vehicle 10 can include a body 12, a pair of front wheels, 14L, 14R, a pair of rear wheels 16L, 16R, a frame assembly 18, a pair of front door assemblies 70, 78, a pair of rear door assemblies 73, 79, and a powertrain. Portions of the frame assembly 18 are hidden from view in FIG. 1 by the body 12 (but are shown in FIG. 3, for example), and the powertrain is omitted for simplicity and clarity of the drawings.

The vehicle 10 can include a pair of front seats 22L, 22R and a pair of rear seats 23L, 23R mounted in a passenger area of the vehicle 10. The frame assembly 18 can include a roll cage 28 configured to extend around and above the seats 22L, 22R, 23L, 23R and the passenger area. The roll cage 28 can cooperate with the body 12 and/or at least a portion of the frame assembly 18 to define door openings through which a passenger may pass in order to enter or exit the passenger area.

The door assemblies 70, 73, 78, 79, which occupy the door openings, each can include a panel door assembly, and can be configured to selectively open and close access through the door openings by moving between a closed position and a partially opened or fully opened position. In the closed position, the door assemblies 70, 73, 78, 79, can span the respective door openings to obstruct access to or from the passenger area via the door openings. In the closed position or disposition, the front portion of each door assembly 70, 73, 78, 79 can be latched to the roll cage 28. The partially opened position (or disposition) or the fully opened position (or disposition) can be any position where the door assemblies 70, 73, 78, 79 are pivoted away from the respective door openings to provide substantially unobstructed access to the passenger area via the door openings.

Figure 2:
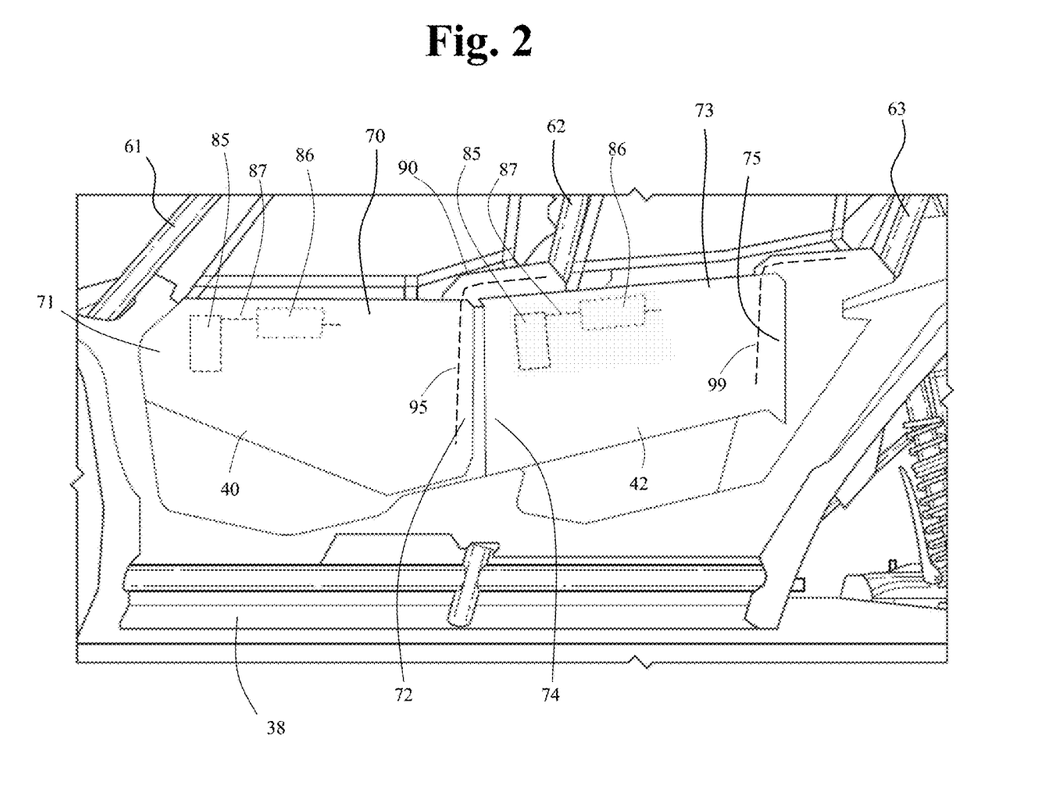
FIG. 2 is a left partial side view showing details of door assemblies of the vehicle shown in FIG. 1 in accordance with the disclosed subject matter.

FIG. 3 shows the left-side door assemblies 70, 73 in the open position and the right-side door assemblies 78, 79 in the closed position. Each of the door assemblies 70, 73, 78, 79 can be constructed as desired. For example, with reference to the left side of the vehicle as shown in FIG. 2, the door assemblies can be constructed of one or more panels of a respective panel assembly 40, 42. Each of the panel assemblies can have an uninterrupted exterior surface. Alternatively, the door panel assemblies 40, 42 can be constructed in various other manners as may be desired. For example, each of the door panel assemblies 40, 42 can include an inner door panel that faces toward the passenger area of the vehicle 10 and an outer door panel that faces toward the exterior of the vehicle 10. The outer door panel is shown in FIGS. 1-3. The inner door panel can be connected to the outer door panel such that a space is enclosed therebetween. One or more of the door panel assemblies 40, 42 can have a continuous outer surface or an outer surface that is interrupted by one or more holes, ridges and/or other contour or character features.

The vehicle 10 can include a powertrain. The powertrain can include an internal combustion engine, one or more electric motor(s) or a hybrid of an internal combustion engine and one or more electric motor(s), or other known engine/motor. The powertrain can have the engine/motor output axis oriented in the longitudinal direction L or in the traverse direction T of the vehicle 10. The powertrain can be configured to drive only the front wheels 14L, 14R, or configured to drive only the rear wheels 16L, 16R, or configured to drive all of the wheels 14L, 14R, 16L, 16R, or configured to drive the rear wheels 16L, 16R and selectively drive the front wheels 14L, 14R, or configured to drive the front wheels 14L, 14R and selectively drive the rear wheels 16L, 16R.

Referring to FIGS. 1 and 3, the body 12 can be formed of one or more panels mounted on the frame assembly 18. For example, the body 12 can include a panel extending around each of the wheels 14L, 14R, 16L, 16R, a roof panel 13, one or more panels that form a cargo/storage area 15 at the rear of the vehicle 10. The roof panel 13 is omitted from FIG. 3 in order to better illustrate a passenger area of the vehicle 10.

The frame assembly 18 can be configured to support the body 12, door assemblies 70, 73, 78, 79, seats 22L, 22R, 23L, 23R, suspension components for the wheels 14L, 14R, 16L, 16R, powertrain, steering system, control pedal assemblies, passengers and cargo items, for example. The frame assembly 18 can be configured to withstand various modes of operation, including operation on unimproved paths, and can be configured to surround the passenger area. The frame assembly 18 can include a main frame assembly 30, a front frame assembly 32 and a rear frame assembly 36.

The main frame assembly 30 can define the passenger area of the vehicle 10. The main frame assembly 30 can also provide an overall bending stiffness and torsional stiffness characteristic for the vehicle 10 that can be advantageous for rugged terrain of an unimproved path.

The front frame assembly 32 can be connected to the front end of the main frame assembly 30. The front frame assembly 32 can be configured with mounting points for the front suspension components and any appropriate components/systems, such as but not limited to portions of the body 12, a front final drive assembly, steering system components, engine cooling system, headlights, etc.

A front bumper assembly can be connected to the front end of the front frame assembly 32, such that the front frame assembly 32 can be located between the front bumper assembly and the main frame assembly 30. A front bumper assembly can extend beyond the exterior of the body 12, or alternatively, one or more portions of the body 12 can conceal a front bumper assembly.

The rear frame assembly 36 can be connected to the rear end of the main frame assembly 30 such that the passenger compartment is located between the front frame assembly 32 and the rear frame assembly 36. The rear frame assembly 36 can be configured with mounting points for the rear suspension components and any appropriate components/systems, such as but not limited to portions of the body 12, a rear final drive assembly, taillights, etc.

The main frame assembly 30, front frame assembly 32 and rear frame assembly 36 can be made from any appropriate structural element(s), such as but not limited to tubes, beams, stampings, etc., that can provide sufficient strength and rigidity for a vehicle passenger area. The frame assembly 18 can be formed from a single type of structural element, or alternatively the frame member 18 can be formed from any combination of these structural elements. The structural elements can have any appropriate cross-sectional shape, such as but not limited to circular, rectangular, regular polygonal, irregular polygonal, hollow, solid, variable along the length of the structural element, etc.

The structural elements can be formed by any appropriate process, such as but not limited to rolling, hydroforming, bending, welding, extruding, stamping, any combination of these processes, etc. Each structural element of the frame assembly 18 can be formed from any appropriate material, such as but not limited to steel, aluminum, titanium, magnesium, plastic, fiber-reinforced plastic, carbon fiber, ceramic, a composite formed from any combination of these exemplary materials, etc. Each structural element of the frame assembly 18 can be connected to each adjoining structural element in any appropriate manner, such as but not limited to mechanical fasteners, welding, adhesive, any combination thereof, etc.

Further referring to FIG. 1 and FIG. 2 and the left side of the vehicle, the front frame assembly 32 can be connected to a lower cross member and a first cage side member 61 of the main frame assembly 30. Referring to FIG. 1, the front frame assembly 32 can be configured to support a front suspension and wheel assembly 57 (FIG. 1), and other components such as but not limited to a radiator, a steering rack assembly and a front final drive assembly. The front suspension and wheel assembly 57 can include a front suspension member on each side of the front frame assembly 32, and a damper and spring assembly on each side of the front frame assembly 32.

The front frame assembly 32 can include or be connected to front lower frame members, as well as other associated frame members, which can be configured as hollow metal tubes having a substantially circular cross-section. However, any combination of the front frame members can be or have a cross-sectional shape that is different from a substantially circular cross-sectional shape. Further, any combination of the front frame members, including front frame members and other associated frame members, can be formed of a material other than metal, such as but not limited to carbon fiber, plastic, carbon fiber reinforced plastic, ceramic, pulp, or glass fiber reinforced plastic.

Further, the front lower frame members and other associated frame members can be welded to each other to form the structure described above. Embodiments are intended to include or otherwise cover any combination of the front lower frame members and other associated frame members connected by threaded fasteners, adhesives, a combination of brackets and threaded fasteners, rivets, or other known connective structures, materials, or methods.

Further referring to FIG. 1, the rear frame assembly 36 can be configured to support a rear suspension and wheel assembly 58, and other components such as but not limited to a power source, a transmission and a rear final drive assembly. The rear suspension and wheel assembly 58 can include, for example, at least one rear suspension member on each side of the rear frame assembly 36, a rear damper and spring assembly on each side of the rear frame assembly 36, a rear hub assembly on each side of the rear frame assembly 36, and the rear wheels 16L, 16R.

The rear frame assembly 36 can be connected to and can extend away from the main frame assembly 30 in the longitudinal direction L of the vehicle 10.

The rear frame assembly 36 in conjunction with other support components can be configured to support a powertrain assembly. For example, an exemplary powertrain, as described above, can include a power source such as but not limited to an internal combustion engine (having a single cylinder or a plurality of cylinders), an electric motor, or a hybrid system that includes an internal combustion engine and an electric motor. The powertrain also can include a transmission connected to the power source and a final drive structure. The transmission can include various types of transmissions including a stepped speed ratio assembly or a continuously variable speed ratio assembly. The transmission can be configured as an automatic transmission, a manual transmission, or a semi-automatic transmission. A power source and the transmission can be connected to the rear frame assembly 36 in any appropriate manner such as but not limited to brackets and mechanical fasteners, welds, rivets, rubber mounting assembly(ies), fluid filled mounting assembly(ies), or any combination thereof.

Further referring to FIGS. 1-3, the main frame assembly 30 can define the passenger area and can include the roll cage 28, longitudinal frame members 38 on opposing sides of the vehicle, lower cross members, and other frame members. Frame members can be connected together to form a fixed frame assembly or modular frame assembly in which selective removal and attachment is not or is intended. That is, the frame members can be intended to remain fixed to each other unless a destructive process such as but not limited to sawing, cutting, crushing, ripping, melting, etc., is applied to the fixed frame assembly. In contrast, some frame members can be intended to be selectively removable and attachable to a remainder of the main frame assembly 30, for example, without requiring a destructive process such as but not limited to sawing, cutting, crushing, ripping, melting, etc. The longitudinal members 38 can extend in the longitudinal direction L of the vehicle 10, from the front of the passenger area to the rear of the passenger area. The longitudinal members 38 can each be configured as a substantially straight, hollow beam having a substantially rectangular cross-sectional shape.

As shown in FIG. 3, a roll cage 28 generally defines the passenger area or compartment. The roll cage 28 can extend in the longitudinal direction L of the vehicle 10, from the front end of the passenger area to the rear end of the passenger area. The roll cage 28 can define the limits of the passenger area in the transverse direction T of the vehicle 10, the longitudinal direction L of the vehicle 10 and in the vertical direction V of the vehicle 10. The roll cage 28 can be configured to support the door assemblies 70, 73, 78, 79 and any appropriate portion(s) of the body 12, such as but not limited to flexible side panel(s) (transparent, opaque, or a combination thereof), rigid side panel(s), roof panel (rigid or flexible), flexible or rigid rear panel (transparent, opaque, or a combination thereof), etc.

The roll cage 28 can be configured to resist, impede, or minimize deformation that could be caused by a load or kinetic energy input into the roll cage 28. The roll cage 28 can be configured with any shape and contour that can be advantageous to mate the structural performance and aesthetic appeal desired for the vehicle 10. The roll cage 28 can be formed from any appropriate number of structural elements, from one to any number greater than one. For example and referring to FIGS. 1 and 3, the roll cage 28 can include a plurality of cage cross members 52, 54, and 56 and a plurality of cage side members 61, 62, 63, 64 and 65, and the right side of the vehicle can be mirror image to the left side of the vehicle shown in FIG. 1. Each of the cage members can be configured as a hollow tube having a substantially circular or oval cross-section shape. The cage members can be configured with any appropriate elongated shape that can provide the desired dimensionality of the passenger area and advantageously conform to the aesthetic appearance desired for the vehicle 10. For example, the cage members can be made from one or more lengths of a metal tube. Any one of the tubular cage members can be bent in one or more locations into a predetermined shape.

Each of the first cage side members 61 can be referred to as an A-pillar. Each of the first cage side members 61 can be connected at one end to a respective one of the longitudinal members 38 adjacent the front end of the respective one of the longitudinal members 38. Each of the first cage side members 61 can extend along each of the vertical direction V, the transverse direction T and the longitudinal direction L of the vehicle 10.

As shown in FIG. 3, the roll cage 28 may also include fourth cage side members 64. Each of the fourth cage side members 64 can be referred to as a roof rail or a top rail. Each of the fourth cage side members 64 can extend from and connect to a respective one of the first cage side members 61. Each of the fourth cage side members 64 can connect to a respective one of the third cage side members 63. Each of the fourth cage side members 64 can connect to a respective one of second cage side members 62. Each of the fourth cage side members 64 can connect to a respective one of the fifth cage side members 65. Each of the fourth cage side members 64 can extend along at least the longitudinal direction L of the vehicle 10.

The first cage cross member 52 can be connected to either the first cage side members 61 or the fourth cage side members 64 at a location that is adjacent to or at the junction of the first cage side members 61 and the fourth cage side members 64. Alternatively, the first cage cross member 52 can be connected at the junction of the first cage side members 61 and the fourth cage side members 64.

Each of second cage side members 62 can be referred to as a B-pillar. Each of the second cage side members 62 can be connected at a first end to a respective one of the longitudinal members 38 along the side of the respective one of the longitudinal members 38. Each of the second cage side members 62 can be connected to an outer side of the respective one of the longitudinal members 38.

Each of the second cage side members 62 can be connected at a second end to a respective one of the fourth cage side members 64. The second cage cross member 54 can be connected to either the fourth cage side members 64, or the second cage side members 62, or a location that is adjacent to or at the junction of the fourth cage side members 64 and the second cage side members 62.

Each of third cage side members 63 can be referred to as a C-pillar. Each of the third cage side members 63 can be connected at a first end to a respective one of the longitudinal members 38 along the side or at the rear end of the respective one of the longitudinal members 38. Each of the third cage side members 63 can be connected to an outer side of the respective one of the longitudinal members 38.

Each of the third cage side members 63 can be connected at a second end to either a respective one of the fourth cage side members 64 or a respective one of fifth cage side members 65 at a location that is adjacent to or at a junction of the respective one of the fourth cage side members 64 and the respective one of the fifth cage side members 65. Alternatively, each of the third cage side members 63 can be connected at the second end to the junction of the respective one of the fourth cage side members 64 and the respective one of the fifth cage side members 65.

The third cage cross member 56 can be connected to either the fourth cage side members 64, or the third cage side members 63, or the fifth cage side members 65, or alternatively, at a location that is adjacent to or at the junction of the fourth cage side members 64, or the third cage side members 63, or the fifth cage side members 65.

Each of the fifth cage side members 65 can be connected to and extend away from a respective one of the fourth cage side members 64 along the longitudinal direction L of the vehicle 10.

The cage cross members 52, 54, 56, can extend in the transverse direction T of the vehicle 10 from the left side of the roll cage 28 to the right side of the roll cage 28. The cage cross members 52, 54, 56, can be connected to each of respective pair(s) of the cage side members at respective locations spaced apart along the longitudinal direction L of the vehicle 10. The cage cross members 52, 54, 56, can be configured to maintain a predetermined spacing between the cage side members 61, 62, 63, 64, 65 in the transverse direction T. The cage cross members 52, 54, 56 can define limits of the passenger area in the longitudinal direction L of the vehicle 10 and the vertical direction V of the vehicle 10. The cage cross members 52, 54, 56 can be configured to manage load and/or energy inputs so that deflection of the frame assembly 18 in the vicinity of the passenger area can be controlled in an advantageous predetermined manner. In the exemplary embodiment of FIG. 3, the cage cross members 52, 54, 56 can be connected to a respective left-side and right-side pair of the cage side members 61, 62, 63, 64, 65 by welding.

As shown in FIG. 2, the vehicle 10 can include a rear door assembly 73. The rear door assembly 73 can include a rear portion 75. The rear door assembly 73 may be pivotally supported by a hinge assembly at or adjacent to the rear portion 75 so as to allow movement of the rear door assembly 73 between a closed position and an open position. The rear door assembly 73 can include a front portion 74.

As shown in FIG. 2, the vehicle 10 can include a front door assembly 70. The front door assembly 70 can include a front portion 71 and a rear portion 72. The front door assembly 70 may be pivotally supported by a front hinge assembly 95 (schematically represented by a dotted line in FIG. 2) at or adjacent to the rear portion 72 so as to allow movement of the front door assembly 70 between a closed position and an open position.

Each of the door assemblies 70, 73, 78, 79 can include a net assembly 80 that includes a mesh netting 81 and a frame 82 that surrounds the mesh netting 81. The frame 82 can be connected to each of the frame assembly 18 and a respective one of the door panel assemblies 40, 42. Accordingly, a respective net assembly 80 can be positioned above the front door panel assembly 40 and/or above the rear door panel assembly 42. The net assembly 80 can serve to block or close off an upper portion of an opening in the vehicle frame or vehicle frame assembly 18. The net assembly 80 can operate in conjunction with one or more door panels, of a door, to selectively open and close an opening in the vehicle frame assembly 18.

Each of the door assemblies 70, 73, 78, 79 can include a latch assembly 85, and handle assembly 86, and a connecting mechanism 87, as schematically represented in FIG. 3. The latch assembly 85 can be constituted by structure that slides, rotates, or otherwise moves so as to releasably engage with a striker 88 (FIG. 4) mounted on the frame 18 of the vehicle 10. As a result of such engagement, the particular door, upon which the latch assembly 85 is mounted, can be releasably held in a closed position. For example, the latch assembly 85 can include or be in the form of one or more movable claw(s) or hook(s) that engage(s) the striker 88 when the door assembly is in the closed position. The latch assembly 85 can be mechanically attached or connected to the handle assembly 86 by a connecting mechanism 87. The connecting mechanism 87 can be a rotating rod, for example.

The striker 88 can be attached to or be a component of the frame assembly 18 of the vehicle 10 as described below. The striker 88 can have any appropriate structure that can be selectively engaged and disengaged by the latch assembly 85. For example, the striker 88 can be formed from a metal rod that is bent into a substantially U-shape or n-shape, with the free ends of the striker 88 connected to a striker base 89 in any appropriate manner such as but nit limited to welding, adhesive, mechanical fasteners. The striker 88 and the striker base 89 collectively can be referred to as a striker assembly 112. A striker assembly 112 for the front door assembly 70 can be mounted to the first cage side member 61 directly or indirectly via a bracket that is secured to the first cage side member 61 by any appropriate manner such as but not limited to welding, adhesive, and mechanical fasteners. A striker assembly 112 for the rear door assembly 73 can be mounted to the second cage side member 62 directly or indirectly via a bracket that is secured to the second cage side member 62 by any appropriate manner such as abut not limited to welding, adhesive, and mechanical fasteners. Further details of the striker assembly 112 will be discussed below.

Figure 4:
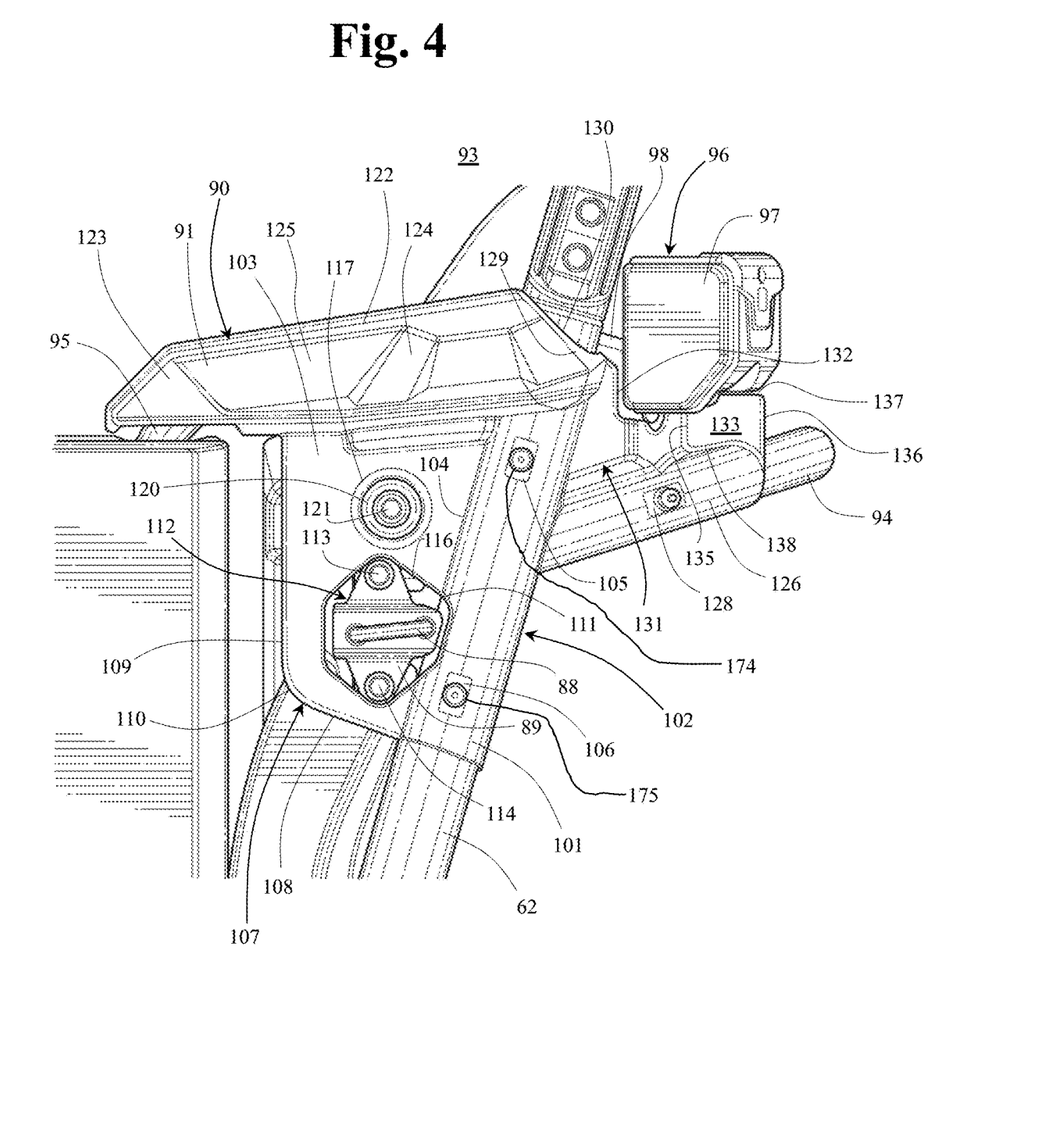
FIG. 4 is a side view as viewed from the exterior of the vehicle of FIG. 1 and toward the left side of the vehicle with the left rear door omitted and showing details of a vehicle assembly in accordance with the disclosed subject matter.
Figure 6:
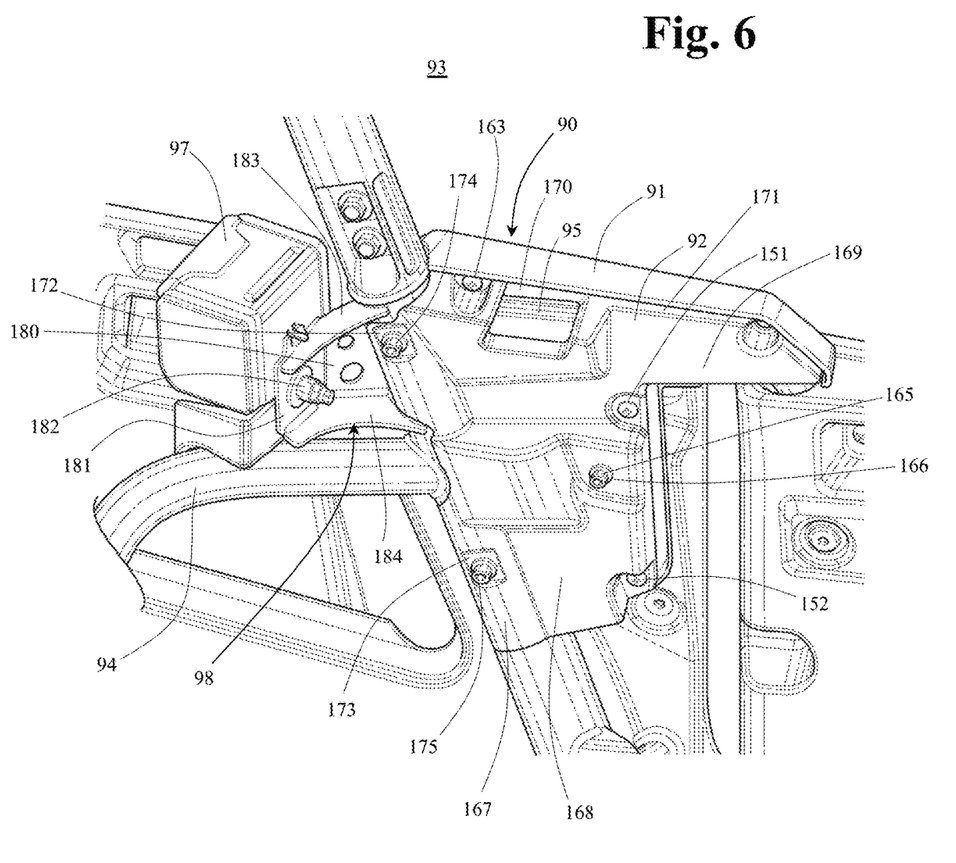
FIG. 6 is a side view as viewed from the interior of the vehicle of FIG. 1 and toward the left side of the vehicle and showing details of the vehicle assembly of FIG. 4, including the second cover member, in accordance with the disclosed subject matter.

In accordance with one or more embodiments of the disclosure, the vehicle 10 can include a cover assembly 90. The cover assembly 90 can include a first cover member 91 and a second cover member 92. FIG. 4 is a side view of as viewed from the exterior of the left side of the vehicle 10 and shows the first cover number 91, in accordance with one or more embodiments of the disclosure. FIG. 6 is a side view as viewed from the interior of the vehicle and toward the left side of the vehicle 10 and shows the second cover assembly 92 connected to a frame assembly and to the first cover 91, in accordance with one or more embodiments of the disclosure.

FIG. 4 also shows various components or assemblies associated with the cover assembly 90. The cover assembly 90 and the various components or assemblies associated with the cover assembly 90 can collectively be characterized as a vehicle assembly 93. The vehicle assembly 93 can include a portion of frame assembly 18 including the second cage side member or B-pillar 62. The vehicle assembly 93 can also include a grab bar 94. The grab bar 94 can be attached to and extend from a rear side of the second cage side member 62. Referring to FIG. 3, the grab bar 94 can extend across the vehicle 10 along the transverse direction of the vehicle 10 and can be attached to the second cage side member 62 on the right side of the vehicle. Alternatively, the grab bar 94 can extend across the vehicle to some interim location, such as halfway or approximately halfway across the vehicle. In this alternate embodiment, the grab bar 94 can be combined with a similar or mirror image grab bar 94 on the right-hand side of the vehicle such that each of the rear seats 23L, 23R is aligned with a respective grab bar. The grab bar 94 can be welded or otherwise attached to a rear side of the second cage side member 62. The grab bar 94 and the second cage side member 62 collectively can be referred to as a frame sub-assembly, or as a frame assembly 62, 94.

The vehicle assembly 93 can also include the front hinge assembly 95. The front hinge assembly 95 can extend from a front side of the second cage side member 62. The front hinge assembly 95 can be connected to the second cage side member 62 in any appropriate manner such as but not limited to welding, adhesive, and mechanical fasteners. The front hinge assembly 95 can include a forwardly extending horizontal portion that is connected to a downwardly oriented or vertical door support portion. The door support portion can support the front door panel assembly 40. Further details are described below with reference to FIG. 5. The vehicle 10 can include a rear hinge assembly 99 that has structure identical to or similar to the front hinge assembly 95. FIG. 3 schematically represents the rear hinge assembly 99. The front hinge assembly 95 can be configured as a single bent pipe. However, alternate embodiments can include a plurality of parts that are connected to together, or a pair of plate parts that are connected by a common pin such that the plate parts can pivot relative to each other, and one of the plate parts is fixed to the door panel assembly 40 and the other of the plate parts is fixed to the second cage side member 62.

The vehicle assembly 93 can also include a seat belt retractor assembly 96. The seat belt retractor assembly 96 can include a spool housing 97 and a seatbelt retractor bracket 98. The spool housing 97 can house a spool, which can be attached to one end of a strap or belt. Inside the spool housing 97, a spring or other mechanical device can be utilized to provide a retractor mechanism that can apply a rotational force to the spool. The rotational force and mechanical arrangement of the spool can be configured to selectively wind and unwind a seatbelt, as well as configured to apply a tension force and lock the seat belt in tension. In the exemplary embodiment of FIGS. 4-6, the spool housing 97 can be in the form of a square or rectangular box provided with rounded corners.

Figure 5:
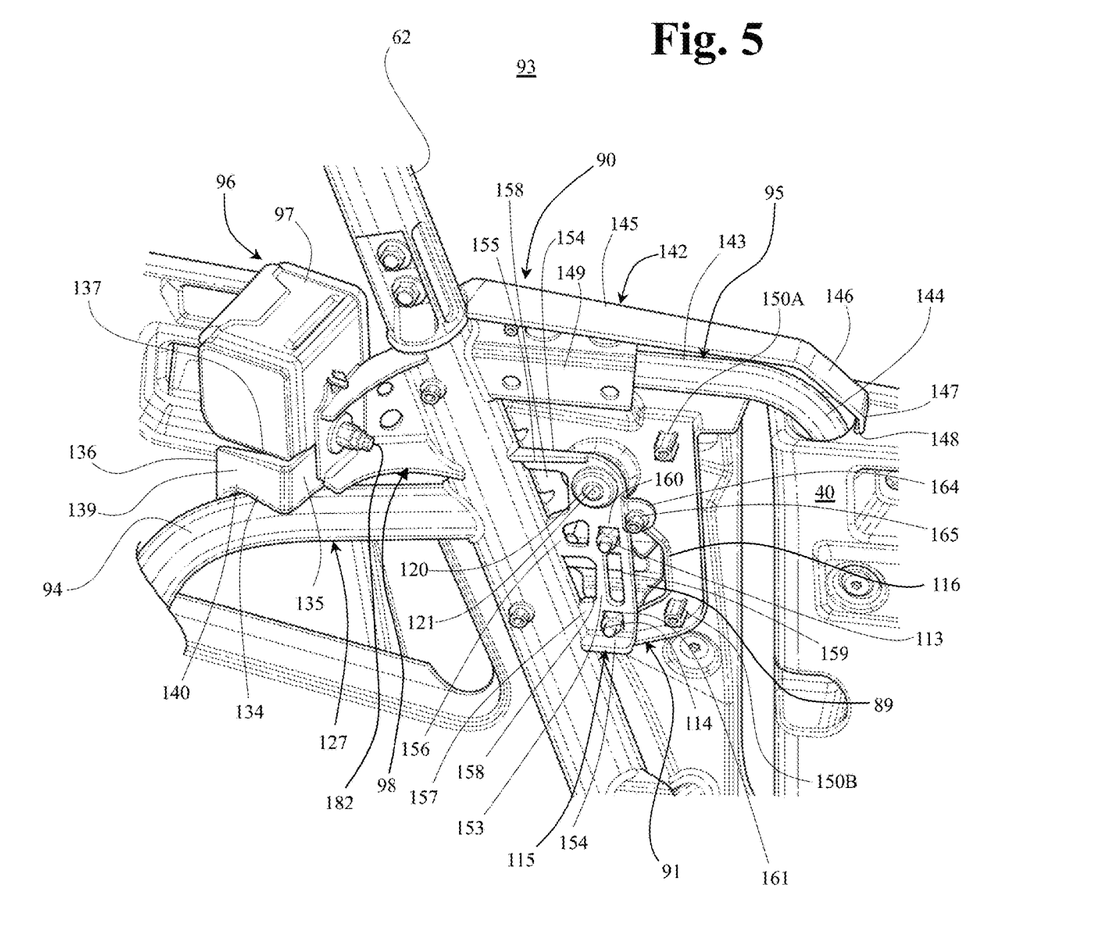
FIG. 5 is a side view as viewed from the interior of the vehicle of FIG. 1 and toward the left side of the vehicle and showing details of the vehicle assembly of FIG. 4, with a second cover member removed, in accordance with the disclosed subject matter.

The spool housing 97 can be attached to the second cage side member 62 by the seat belt retractor bracket 98. The seatbelt retractor bracket 98 can be attached to the spool housing 97 by welding, mechanical fasteners, etc. FIGS. 5 and 6 show a threaded fastener assembly 100 releasably connecting the spool housing 97 to the seatbelt retractor bracket 98. The seatbelt retractor bracket 98 can be attached to the second cage side member 62 by welding, mechanical fasteners, etc. The spool housing 97, as supported by the seat belt retractor bracket 98, can be spaced away from the grab bar 94. Additionally, the seatbelt retractor bracket 98 can be spaced away from the second cage side member 62.

Referring to FIGS. 4-6, the first cover member 91 can be outboard of the second cover member 92 such that the first cover member 91 can be located between the left rear door assembly 73 and the second cover 92 when the left door assembly 73 is in the closed position. The first cover member 91 can be attached to or mated with the second cover member 92. The first cover member 91 and the second cover member 92 can be formed form any appropriate material such as but not limited to plastic, metal, carbon fiber, a composite material, and any combination of these materials. In the exemplary embodiment of FIGS. 1-6, the cover members 91, 92 can be constructed of injection molded plastic.

The first cover member 91 can include a first sleeve portion 101. The first sleeve portion 101 can include or be in the shape of a circumferential portion of a cylinder. Accordingly, the first sleeve portion 101 can encompass or wraparound a portion of the second cage side member 62, which accordingly can be characterized as including the first portion 102 of the frame assembly 18. The first portion of the second cage member 62 can also be referred to as a first portion 102 of a frame assembly such as but not limited to the frame assembly 18 and the frame assembly 62, 94. The first sleeve portion 101 can be concave on an interior thereof so as to effectively mate with the second cage side member 62.

The first cover member 91 can include a main body portion 103. The main body portion 103 can include a flat or substantially flat member. The main body portion 103 can extend from the first sleeve portion 101 at an integral junction 104 such that the sleeve portion 101 is continuous with and curves outwardly away from an exterior surface of the main body portion 103 and the sleeve portion 101 has a convex shape with respect to the exterior surface of the main body portion 103. The main body portion 103 can be supported, at least in part, by the first sleeve portion 101. The first sleeve portion 101 can include an upper mounting surface 105 and a lower mounting surface 106. Each of the mounting surfaces 105, 106 can be flat and can include a through hole such that a mechanical fastener can through the first sleeve portion 101 and into the second cage side member 62 to secure the first cover member 91 to the second cage side member 62. The mounting surfaces 105, 106 can be on raised member that extends away from the curved surface of the sleeve portion 101 such that the mounting surfaces 105, 106 are spaced away from the curved surface of the sleeve portion 101. In an alternate embodiment, the mounting surfaces 205 can be recessed below a portion of the curved surface of the sleeve portion 101.

The first cover member 91 can include a peripheral wall 107. The peripheral wall 107 can include a peripheral lower wall 108 and a peripheral forward wall 109. A junction 110 of the peripheral lower wall 108 and the peripheral forward wall 109 can include a curved wall portion. The peripheral wall 107 can extend inwardly or in an inboard direction along a periphery of the main body portion 103. Accordingly, an edge of the peripheral wall 107 can be attached along a portion of the periphery of the main body portion 103. The peripheral wall 107 can extend away from the main body portion 103 and toward an interior of the vehicle 10 along the transverse direction T of the vehicle 10.

The main body portion 103 can include an opening 111. The opening 111 can be shaped so as to allow access to the striker assembly 112 and/or so as to allow the striker assembly 112 to extend outwardly through the opening 111. The striker 88 can be positioned relative to the first cover 91, the second cages side member 62 and the rear door assembly 73 so as to be engageable with a latch assembly 85 when the rear door assembly 73 is in the closed position. Also, the opening 111 can provide access to an upper striker fastener 113 and a lower striker fastener 114. The striker fasteners 113, 114 can serve to attach the striker assembly 112 to a striker bracket 115, described further below. For example, the opening 111 can be in the shape of a hexagon or 6-sided polygon. However, the opening 111 is not limited to any particular shape. The opening 111 can include and be defined by an inner flange 116 that extends around and that defines the opening 111. The inner flange 116 can provide structural strength and be aesthetically pleasing. The inner flange 116 can extend away form the main body portion 103 and toward the interior of the vehicle 10 along the transverse direction T of the vehicle 10.

The main body portion 103 can also include a bumper area 117. The bumper area 117 can include a recessed area, as shown in FIG. 4, that can house or support a bumper 120 and a bumper fastener 121. The bumper 120 can be provided to engage with rear door assembly 73 and cushion the rear door assembly 73 in closing the rear door assembly 73. For example, the bumper 120 can be constructed of rubber and be in the shape of a disk that extends through the main body portion 103 and is supported by the main body portion 103. The bumper fastener 121 can include a bolt or other suitable fastener that can secure to the bumper 120 to the first cover 91 and/or to the second cage side member 62. The bumper area 117 can be recessed or concave so as to support, center and orient the bumper 120. In the exemplary embodiment of FIG. 4, the bumper fastener 121 can secure the bumper 120 and the first cover 91 to the striker bracket 115.

The first cover member 91 can also include a top body portion 122. The top body portion 122 can extend along and from an upper portion of the main body portion 103. More specifically, a lower central portion of the top body portion 122 can be continuous with and extend away the upper portion of the main body portion 103. A lower rear portion of the top body portion 122 can be continuous with and extend away from an upper portion of the first sleeve portion 101. A lower front portion of the top body portion 122 can extend from the main body portion 103 so as to define, in part, a forward extension 123 of the top body portion 122. The top body portion 122 including the extension 123 can serve to enclose, along with the second cover member 92, the front hinge assembly 95.

As shown in FIG. 4, the top body portion 122 can be provided with convex portion 124 and concave portion 125. The convex portion 124 and the concave portion 125 can be provided for aesthetic appeal. The convex portion 124 and the concave portion 125 extend along a first portion of the front hinge assembly 95.

The first cover member 91 can also include a second sleeve portion 126. The second sleeve portion 126 can include or be in the shape of a circumferential portion of a cylinder. Accordingly, the second sleeve portion 126 can encompass or wraparound a portion of the grab bar 94. The portion of the grab bar 94 encompassed or wrapped by the second sleeve portion can be referred to as a second portion 127 of a frame assembly such as but not limited to the frame assembly 18 and the frame assembly 62, 94. The second sleeve portion 126 can be concave in shape so as to mate with a portion of an outer surface of the grab bar 94. Alternatively, the second sleeve portion 126 can be spaced from an outboard, outer surface of the grab bar 94. The second sleeve portion 126 can include mounting surface 128. The mounting surface 128 can provide access to, support, or house a suitable fastener that is used to attach the second sleeve portion 126 to the grab bar 94. The mounting surface 128 can be of similar or same structure as the mounting surfaces 105, 106 on the first sleeve portion 101 such that a mechanical fastener can pass through the second sleeve portion 126 and into the grab bar 94.

As shown in FIG. 4, the top body portion 122 can include a rear portion 129. The rear portion 129 can extend rearwardly beyond the second cage side member 62 along the longitudinal direction L of the vehicle 10 and on an outboard side of the second cage side member 62. The rear portion 129 can include an upper edge 130 that can abut the cylindrical shape of the second cage side member 62 and that sweeps around an outer surface of the second cage side member 62.

The first cover member 91 can also include a bridge portion 131. The bridge portion 131 can extend rearwardly along the longitudinal direction L of the vehicle 10 from the rear portion 129, of the top body portion 122, and rearwardly along the longitudinal direction L of the vehicle 10 from an upper, rear portion of the first sleeve portion 101. As is shown in FIG. 4, the bridge portion 131 can be shaped and include a contoured surface 132 so as to be closely fit with and/or mate with exterior shape of the spool housing 97 of the seatbelt retractor assembly 96. Accordingly, the contoured surface 132 can include angled, flat, curved, recessed, and/or other geometrical shapes so as to closely fit with and/or mate with the seatbelt retractor assembly 96.

A rear portion of the bridge portion 131 and a rear, upper portion of the second sleeve portion 126 can be attached to and support an extension member 133. The extension member 133 can extend toward the interior of the vehicle 10 along the transverse direction T of the vehicle 10 and away from its attachment with the bridge portion 131 and the second sleeve portion 126. In particular, the extension member 133 can extend through and occupy a gap between the seatbelt retractor assembly 96 and a portion of the grab bar 94 that corresponds to the second portion 127 of the frame assembly 18 or frame assembly 62,94. The extension member 133 can include a bottom wall 134, a front wall 135, a rear wall 136 and a top wall 137.

The bottom wall 134 can be continuous with and extend away from the second sleeve portion 126. The front wall 135 can be continuous with and extend away from the bridge portion 131. More specifically, the bottom wall 134 can be joined with the second sleeve portion 126 along a lower portion or extent of a transitional surface or fillet 138. The front wall 135, of the extension member 133, can be continuous with and extend away from the bridge portion 131 along an upper portion or extent of the transitional surface or fillet 138. The second sleeve portion 126, the first sleeve portion 101, the main body portion 103, the top body portion 122, the bridge portion 131, and the extension member 133 can be integrally formed, in accordance with one or more embodiments of the disclosure. For example, such components can be integrally formed by an injection molding process.

FIG. 5 is a perspective view, from an inboard perspective looking outboard, of a vehicle assembly 93, in accordance with one or more embodiments of the disclosure.

FIG. 5 shows further details of the extension member 133, of the first cover member 91. The extension member 133 can include an inboard wall 139. As shown in FIG. 5, the inboard wall 139 can provide an end of the extension member 133. Accordingly, the inboard wall 139 can provide a wall that connects the front wall 135 the top wall 137 the rear wall 136 and the bottom wall 134. The inboard wall 139 can be planar or flat in contour. FIG. 5 also illustrates that the bottom wall 134 can be concave or include a concave section, portion or area that faces toward the grab bar 94. FIG. 5 illustrates an inboard edge 140 of the bottom wall 134. Such concavity can be provided to mate with a surface of the grab bar 94, i.e. at the second portion 127 of the frame assembly 127. As a result, access into a gap between the seat belt retractor assembly 96 and the grab bar 94 can be prevented or obstructed.

As is shown in FIG. 5, the top wall 137 and the rear wall 136 can can effectively preclude or obstruct access to a gap between the seat belt retractor assembly 96 and the grab bar 94 in conjunction with allowing access to a lower surface or extent of the seatbelt retractor assembly 96.

As discussed above, the bridge portion 131 and the extension member 133 can extend across the gap and into the gap, respectively, between the grab bar 94 and the spool housing 97 of the seat belt retractor assembly 96. Although the exemplary embodiments of the bridge portion 131 and the extension member 133 abut the grab bar 94, at least a portion of either the bridge portion 131 or the extension member 133 can be spaced away from the grab bar 94. Further, the bridge portion 131 and/or the extension member 133 can be spaced away from the spool housing 97 by any appropriate dimension such that unwanted objects do enter the gap therebetween. Thus, the cover assembly 90 can cover at least a portion of the gap between the grab bar 94 and the spool housing 97 of the seat belt retractor assembly 96.

As described above, the top body portion 122 including the forward extension 123 can serve to enclose the door support member 95. In particular, the top body portion 122 can cooperate with the second cover 92 to enclose a horizontal portion 143 of the front hinge assembly 95 and a hinge portion 144 of the front hinge assembly 95. The horizontal portion 143 can be connected to and extend forwardly in the transverse direction T of the vehicle 10 from the second cage side member or B-pillar 62 so as to locate or position the hinge portion 144 at a desired location. Accordingly, a desired pivot point of the front door panel assembly 40 may be provided. A lower portion of the hinge portion 144, which extends into the front door panel assembly 40, may be of straight construction, e.g. a straight tube, so as to allow desired pivoting of the front door panel assembly 40 about the hinge portion 144. Suitable bearings or other attachment structure may be utilized so as to allow pivoting of the front door panel assembly 40 on the hinge portion 144.

As shown in FIG. 5, the top body portion 122 can include a first top flange 142. The first top flange 142 can extend toward the interior of the vehicle 10 along the transverse direction T of the vehicle 10 from an upper portion of the top body portion 122. The first top flange 142 can include a first top 145, a first angled front 146, a first front skirt 147 and a first front lip 148. The first top 145 and the first angled front 146 can form a continuous surface, along a top of the top body portion 122, so as to wrap around the front hinge assembly 95. The first angled front 146 can terminate at a forward edge thereof with a front skirt 147. The front skirt 147, along with a connected front lip 148, can provide a skirt arrangement that is positioned adjacent to and above the front door assembly 70, which rotates relative to the first top flange 142. Such skirt arrangement including the front skirt 147 and the front lip 148 can be aesthetically pleasing and provide a curved outer surface or edge.

As described above, the front hinge assembly 95 can be connected to the second cage side member 62 in any appropriate manner and extend forwardly therefrom along the longitudinal direction L of the vehicle 10. For example, FIG. 5 illustrates a hinge mounting bracket 149 connected to and extending away from the second cage side member 62 along the longitudinal direction L of the vehicle 10 toward the front of the vehicle 10. The hinge mounting bracket 149 can be connected to the second cage side member 62 in any appropriate manner such as but not limited to welding, adhesives and mechanical fasteners. The front hinge assembly 95 can be connected to the hinge mounting bracket 149 in any appropriate manner such as but not limited to welding, adhesives and mechanical fasteners.

The first cover member 91 can include an upper fastener post 150A and a lower fastener post 150B. Each of the fastener posts 150A, 150B can be include a threaded member insert molded in the first cover 91 or provided with a threaded interior bore into which a threaded fastener may be secured. The threaded fastener posts 150A, 150B can be provided for attachment of the first cover member 91 to the second cover member 92. Specifically, as also shown in FIG. 6, a first fastener 151 may pass through the second cover member 92 and into the upper fastener post 150A. A second fastener 152 may pass through the second cover member 92 and into the lower fastener post 150B. It is appreciated that other securement arrangements or mechanisms may be provided to attach the second cover member 92 onto the first cover member 91. For example, the fasteners 151, 152 can be self-tapping threaded fasteners such that the bores in the fastener posts 150A, 150B are plain surfaces and are not threaded.

FIG. 5 shows further details of striker bracket 115, in accordance with one or more embodiments of the disclosure. The striker bracket 115 can include a bracket body portion 153 and an edge flange 154 that encircles at least a portion of the periphery of the striker bracket 115. The edge flange 154 can be provided to add rigidity and structural support to the striker bracket 115. The striker bracket 115 can include an upper connection portion 155 a middle connection portion 156 and a lower connection portion 157. Each of the connection portions 155, 156, 157 can be attached to the second cage side member 62 such as by welding or other attachment mechanism. The bracket body portion 153, of the striker bracket 115, can be provided with any of holes, apertures, reliefs, or structural reinforcement as may be desired. In the exemplary embodiment of FIG. 5, the striker bracket 115 can be provided with one or more reliefs 158 and one or more openings or holes 159. The striker bracket 115 may also be provided with an upper attachment hole 160 and a lower attachment hole 161. The upper attachment hole 160 can provide pass through of the upper striker fastener 113 so as to provide securement of the striker bracket 115 to the upper striker fastener 113. The lower attachment hole 161 can provide pass through of the lower striker fastener 114 so as to provide securement of the striker bracket 115 to the lower striker fastener 114.

The striker bracket 115 can also include a hole or aperture so as to allow pass-through of a bumper fastener 121, also shown in FIG. 4. As also described above, such bumper fastener 121 can provide securement and support to a bumper 120. The bumper 120 can be provided to cushion closing of the rear door panel assembly 42.

FIG. 6 is a perspective view of a vehicle assembly 93, in accordance with one or more embodiments of the disclosure. In particular, FIG. 6 is a perspective view of the vehicle assembly 93 looking from the interior of the vehicle in an outboard direction. FIG. 6 shows the second cover member 92 attached to the first cover member 91 utilizing fasteners 151, 152.

In general, the second cover member 92 can be dimensioned end of geometrical shape to both mate with the first cover member 91 and to provide accommodation for the various components housed within an internal cavity that is created by the first cover member 91 and the second cover member 92. Any number of fasteners or other attachment mechanisms can be utilized to attach the first cover member 91 to the second cover member 92. As described above, fasteners 151, 152 can be used to attach the first cover member 91 to the second cover member 92. Additional fastener 163 can be utilized to attach the cover members 91, 92.

The striker bracket 115, as shown in FIG. 5, can include a securement tab 164. The securement tab 164 can be provided to threadably receive a fastener 165. Such fastener 165 can also be provided to secure the second cover member 92, and specifically to secure the second cover member 92 to the striker bracket 115. Accordingly, the second cover member 92 can be provided with a fastener hole 166. The fastener hole 166 can provide pass through of the fastener 165 so as to provide securement of the second cover member 92 to the securement tab 164 of the striker bracket 115.

The second cover member 92 can also include a third sleeve portion 167. The third sleeve portion 167 can be of similar shape, but mirror image, to the first sleeve portion 101. The third sleeve portion 167 can be connected along a rear portion of a main body portion 168 of the second cover member 92. The second cover member 92 can also include a top body portion 169. As shown in FIG. 6, the top body portion 169 can be continuous with and extend from an upper portion of the main body portion 168. The top body portion 169 can be continuous with and extend from an upward forward portion of the second sleeve portion 167. The main body portion 168 can be provided to correspond substantially with the shape of the main body portion 103, of the first cover member 91. The top body portion 169 can be provided to correspond substantially with the shape of the top body portion 122, of the first cover member 91. The second cover member 92 can be provided with recess 170 that along which a structure extends for securing a strap of the net assembly 80 of the front door assembly 70.

The second cover member 92 can include a second top 171. The second top 171 can be of similar shape to the first top flange 142. The second top 171, of the second cover member 92, can be received by the first cover 91 underneath the first top flange 142. In general, structure of the first cover member 91 can receive therein the second cover member 92 or portions of the second cover member 92. Accordingly, the second cover member 92 can be "nested" within the first cover member 91.

As described above, the second cover member 92 can include a second sleeve portion 167. The second sleeve portion 167 can be provided with an upper mounting surface 172 and a lower mounting surface 173 The mounting surfaces 172, 173 can be same as or similar to the mounting surfaces 105, 106 on the first sleeve portion 101 of the first cover 91. Referring to FIGS. 4 and 6, a threaded fastener assembly 174 can pass through the holes in the upper mounting surfaces 105, 172. A threaded fastener assembly 175 can pass through the holes in the lower mounting surfaces 106, 173 to connect the first sleeve portion 101 and the second sleeve portion 167 to the second cage side member 62.

FIG. 6 also shows retractor bracket 98, in accordance with one or more embodiments of the disclosure. The retractor bracket 98 can include a spacer panel 180 and an attachment panel 181. The spacer panel 180 can be of desired length and geometry so as to space the attachment panel 181, and as a result the spool housing 97, at a desired distance from both the second cage side member 62 and the grab bar 94. A fastener 182 connect the spool housing 97 to the retractor bracket 98. For example, the fastener 182 can be a bolt that is received into a threaded aperture in the spool housing 97.

Retractor bracket 98 can include an upper bracket flange 183 and a lower bracket flange 184. The bracket flanges 183, 184 can be shaped and of geometrical dimension so as to complement the spacer panel 180 and the attachment panel 181. As should be appreciated, the bracket flanges 183, 184 can provide structural support to the retractor bracket 98. The spacer panel 180 can include openings, holes, or relief areas as may be desired.

While an illustrative cover assembly 90 has been described as positioned between the front left door and the rear left door, the disclosure is not limited to such arrangement. A cover assembly 90 of the disclosure can be used with other doors or door assemblies as may be desired.

As described herein, a striker assembly can be provided on the frame assembly and latch assembly can be provided on the door assembly. However, the disclosure is not limited to such arrangement. Accordingly, a striker assembly can be provided on the door assembly and latch assembly can be provided on the frame assembly.

It is appreciated that the various components of embodiments of the disclosure can be made from any of a variety of materials including, for example, metal, plastic, plastic resin, nylon, composite material, leather, and/or rubber, for example, or any other material as may be desired.

The striker bracket 115 and other components of the cover assembly 90 can be formed from a sheet or flat plate of metal by a stamping process. An exemplary stamping process can include a step in which a pair of dies cuts a portion of the metal sheet or plate (also referred to as a blank). The stamping process can cut openings, holes or relief areas from the blank, and can bend portions of the blank to produce the edge flange 154, for example, such that the flat blank is transformed into the three-dimensional structure of the striker bracket 115 and the individual features of the striker bracket 115 discussed above constitute a one-piece, integral, homogenous structure. Thus, the striker bracket 115 can be referred to as a stamped metal bracket. However, a variety of production techniques can be used to make the apparatuses as described herein. For example, suitable casting and/or injection molding and other molding techniques, extrusion and other manufacturing techniques might be utilized.

While the subject matter has been described in detail with reference to exemplary embodiments thereof, it will be apparent to one skilled in the art that various changes can be made, and equivalents employed, without departing from the scope of the invention.

For example, embodiments are disclosed above in which the first cover member 91 or portions thereof is constructed of a single or unitary piece. However, embodiments are intended to include or otherwise cover a first cover member 91 that includes or is constructed of multiple pieces. For example, the multiple pieces of first cover member 91 can be injection molded in pieces and then connected together such as by heat bonding or adhesive, for example.

For example, embodiments are disclosed above in which the first cover member 91 and the second cover member 92, which make up the cover assembly 90, includes a specific shape, geometry, or construction. It is appreciated that shape and structure of components described herein may vary between different types of vehicles. Accordingly, exemplary embodiments are also intended to include or otherwise cover assemblies that include variations in shape, geometry, or construction as dependent on assemblies with which the cover assembly 90 is intended to be utilized.

What is claimed is:

1. A vehicle assembly comprising:
a frame assembly;
a door assembly mounted on the frame assembly and movable relative to the frame assembly between a closed position and an opened position;
a striker assembly mounted on the frame assembly;
a door latch assembly mounted on the door assembly, the door latch assembly includes a latch mechanism configured to releasably engage the striker assembly when the door assembly is in the closed position;
a seat belt retractor assembly configured to selectively wind and unwind a seat belt, the seat belt retractor assembly is mounted on a first portion of the frame assembly, and the seat belt retractor assembly is spaced away from a second portion of the frame assembly by a gap;
a cover assembly mounted on the frame assembly, the cover assembly covers the striker assembly and at least a portion of the gap.

2. The vehicle assembly according to claim 1, wherein the second portion of the frame assembly includes a grab bar that extends in a transverse direction of the vehicle assembly from a first side of the frame assembly, and the gap is located between the grab bar and the seat belt retractor assembly.

3. The vehicle assembly according to claim 2, wherein the grab bar extends in a transverse direction of the vehicle assembly from a first side of the frame assembly to a second side of the frame assembly.

4. The vehicle assembly according to claim 2, wherein the cover assembly extends along the grab bar and into the gap.

5. The vehicle assembly according to claim 1, wherein the first portion of the frame assembly includes a first frame member extending along a vertical direction of the vehicle assembly, and the door assembly is pivotally mounted on the first frame member so as to move between the opened position and the closed position.

6. The vehicle assembly according to claim 5, wherein the second portion of the frame assembly includes a grab bar connected to and extending away from the first frame member along a transverse direction of the vehicle assembly, and the gap extends between the grab bar and the seat belt retractor assembly, and
the cover assembly includes:
a first cover member extending along the first portion of the frame assembly, the first cover member extends along the grab bar and into the gap; and a second cover member opposing the first cover member and extending along the first portion of the frame assembly, the second cover member covers the striker assembly.

7. The vehicle assembly according to claim 6, wherein the frame assembly further includes a striker bracket connected to and extending from the first portion of the frame assembly,
the striker assembly is mounted on the striker bracket,
the first cover member and the second cover member define an inner cavity,
the striker bracket is enclosed within the inner cavity, and
the first cover member includes an opening, and the striker assembly extends away from the striker bracket and through the opening.

8. The vehicle assembly according to claim 7, wherein at least a portion of the second cover member is received into the first cover member in a nested manner.

9. The vehicle assembly according to claim 8, wherein the first cover member includes a first flange and the second cover member includes a second top flange that overlaps with the first top flange the second cover member is received into the first cover member in the nested manner.

10. The vehicle assembly according to claim 6, wherein the first cover member includes:
a sleeve portion that is complementary in shape so as to fit to the first portion of the frame assembly, and the sleeve portion is attached to the first portion of the frame assembly.

11. The vehicle assembly according to claim 10, the first portion of the frame assembly includes a cylindrical outer surface, and the shape of the sleeve portion is concave so as to mate with the cylindrical outer surface of the first portion of the frame assembly.

12. The vehicle assembly according to claim 10, wherein the first cover member further includes
a bridge portion that extends rearwardly from the sleeve portion, and the bridge portion is contoured to fit with the seat belt retractor assembly.

13. The vehicle assembly according to claim 12, wherein the first cover member further includes an extension member that is connected to the bridge portion and extends inwardly and away from the bridge portion so as to cover at least a portion of the gap.

14. The vehicle assembly according to claim 1, wherein the door assembly is mounted on the frame assembly by a hinge assembly that extends forwardly from the first portion of the frame assembly, and the hinge assembly is contained within an internal cavity formed by the cover assembly.

15. The vehicle assembly according to claim 14, wherein the hinge assembly has a curved portion that has a curvature, and the cover assembly includes at least one top flange that is angled so as to follow the curvature of the hinge assembly.

16. A vehicle comprising:
a frame assembly framing a door opening and including:
a first frame member extending along the door opening in a vertical direction of the vehicle; and
a grab bar connected to and extending away from the first frame member in a transverse direction of the vehicle;
a door assembly mounted on the frame assembly and movable relative to the frame assembly between a closed position and an opened position;
a striker assembly mounted on the frame assembly;
a door latch assembly mounted on the door assembly, the door latch assembly includes a latch mechanism configured to releasably engage the striker assembly when the door assembly is in the closed position;
a seat belt retractor assembly configured to selectively wind and unwind a seat belt, the seat belt retractor assembly is mounted on a first portion of the frame assembly, and the seat belt retractor assembly is spaced away from a second portion of the frame assembly by a gap;
a cover assembly mounted on the frame assembly, the cover assembly covering the gap and at least one of the door latch assembly and the striker.

17. An all-terrain vehicle comprising:
a frame assembly including a plurality of frame members connected together to extend around a passenger area and to form a first door opening and a second door opening, the plurality of frame members includes a first frame member extending along a vertical direction of the vehicle, a second frame member connected to the first frame assembly and extending away from the first frame member along a transverse direction of the vehicle, and a third frame member extending along the vertical direction of the vehicle, the first frame member extends between the first door opening and the second door opening, and the second door opening extends between the first frame member and the third frame member;
a plurality of wheels connected to the frame assembly, at least one of the wheels is configured to be driven by a powertrain; and
a first door assembly pivotally connected to the first frame member;
a second door assembly pivotally connected to the third frame member;
a striker assembly mounted on the first frame member;
a door latch assembly mounted on the second door assembly, the door latch assembly includes a latch mechanism configured to releasably engage the striker assembly when the second door assembly is in the closed position;
a seat belt retractor assembly configured to selectively wind and unwind a seat belt, the seat belt retractor assembly is mounted on the second frame member, and the seat belt retractor assembly is spaced away from a second frame member by a gap;
a cover assembly mounted on the first frame member, the cover assembly covers the striker assembly and at least a portion of the gap.

18. The all-terrain vehicle according to claim 17, further comprising:
a hinge assembly connected to and extending from the first frame member into the first door opening, and the cover assembly covers at least a portion of the hinge assembly.

19. The all-terrain vehicle according to claim 18, wherein the hinge assembly includes a first hinge portion that is connected to and extends from the first frame member along a longitudinal direction of the vehicle, and a second hinge portion that is connected to and extends from the first hinge portion along the vertical direction of the vehicle,
the first door assembly is pivotally connected to the second hinge portion, and
the cover assembly covers the first hinge portion.

20. The all-terrain vehicle according to claim 17, wherein the second door assembly covers a portion of the cover assembly when the second door is in the closed position.

* * * * *